US009842017B1

(12) United States Patent
Zhang et al.

(10) Patent No.: US 9,842,017 B1
(45) Date of Patent: Dec. 12, 2017

(54) COLLECTION AND AGGREGATION OF DEVICE HEALTH METRICS

(71) Applicant: Amazon Technologies, Inc., Seattle, WA (US)

(72) Inventors: Yuzhi Zhang, Union City, CA (US); Rafael Camargo, Monte Sereno, CA (US); David Junwei Tse, San Jose, CA (US); Tianhe Wang, Sunnyvale, CA (US); Biju Balakrishna Pillai, Cupertino, CA (US); Maulik Jayesh Pandey, Sunnyvale, CA (US); Melissa Sue Erickson, San Jose, CA (US); Tianwei Liu, Sunnyvale, CA (US); Cyrille Habis, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 28 days.

(21) Appl. No.: 14/673,429

(22) Filed: Mar. 30, 2015

(51) Int. Cl.
  *G06F 11/00* (2006.01)
  *G06F 11/07* (2006.01)
  *H04L 12/26* (2006.01)

(52) U.S. Cl.
  CPC ........ *G06F 11/079* (2013.01); *G06F 11/0709* (2013.01); *G06F 11/0778* (2013.01); *H04L 43/08* (2013.01)

(58) Field of Classification Search
  CPC .................................................. G06F 11/079

USPC ............................ 714/38.1, 38.11, 38.12, 37
See application file for complete search history.

(56) References Cited

U.S. PATENT DOCUMENTS

| | | | | |
|---|---|---|---|---|
| 6,918,059 B1 * | 7/2005 | Galuten | ............ | G06F 11/0715 714/31 |
| 7,949,931 B2 * | 5/2011 | Lastras-Montano | | G06F 11/1044 714/768 |
| 8,577,933 B2 * | 11/2013 | Evenhaim | ........... | G06F 21/6254 705/50 |
| 8,866,069 B1 * | 10/2014 | Miller | ...................... | G01V 8/20 250/261 |
| 9,117,010 B2 * | 8/2015 | Feldman | ................. | G06F 19/32 |

* cited by examiner

*Primary Examiner* — Dieu-Minh Le
(74) *Attorney, Agent, or Firm* — Eversheds Sutherland (US) LLP

(57) ABSTRACT

Device health metrics may be collected and aggregated on a device before sending to a server for further aggregation. The method may include determining a crash has occurred on a device, and recording the crash and information corresponding to the crash in buffer storage on the device. The method may also include recording a crash type, a crash time, an identification of a component that caused the crash and a state of the device when the crash occurred. The method may also include grouping two or more crash events based on the crash type, generating device health metrics data including metadata corresponding to the two or more crash events, storing the device health metrics data in the buffer storage on the device, and sending the device health metrics data along with device identification information to a server for further aggregation.

19 Claims, 11 Drawing Sheets

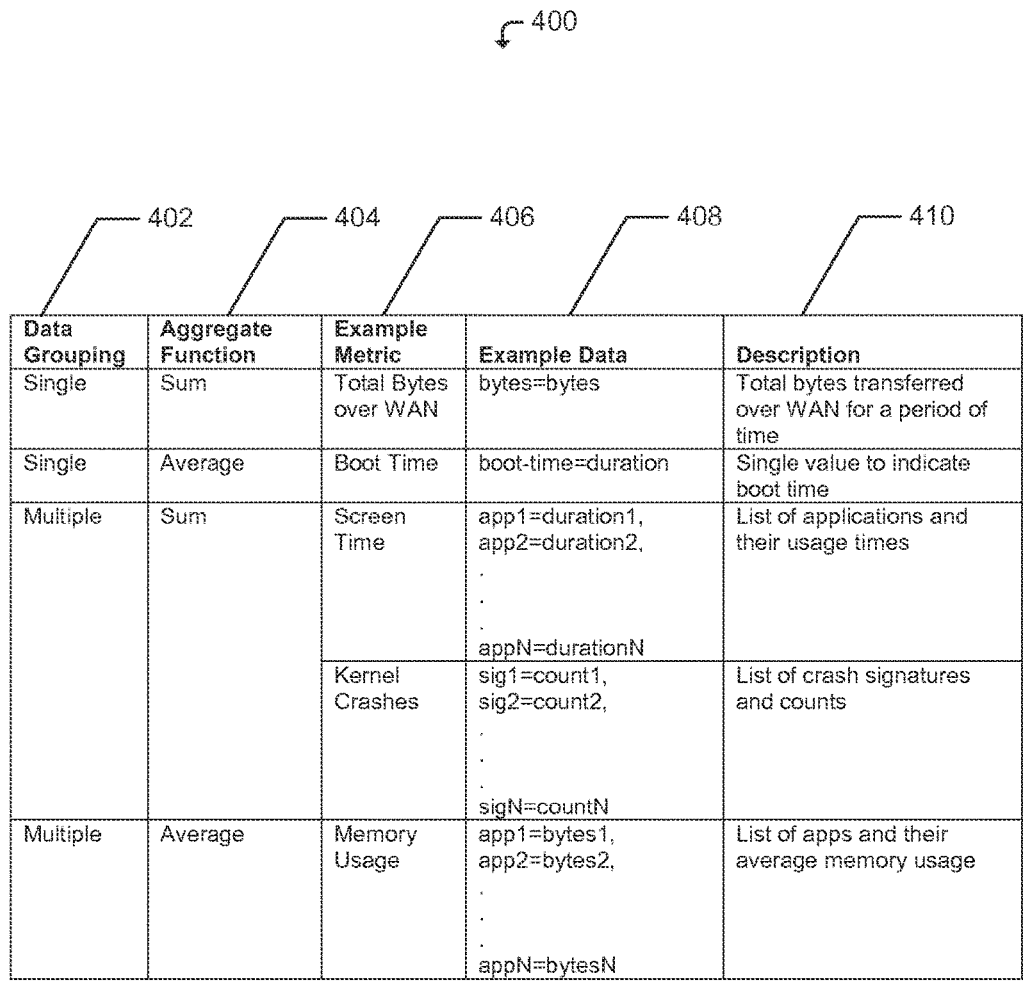

| Data Grouping | Aggregate Function | Example Metric | Example Data | Description |
|---|---|---|---|---|
| Single | Sum | Total Bytes over WAN | bytes=bytes | Total bytes transferred over WAN for a period of time |
| Single | Average | Boot Time | boot-time=duration | Single value to indicate boot time |
| Multiple | Sum | Screen Time | app1=duration1, app2=duration2, . . . appN=durationN | List of applications and their usage times |
| | | Kernel Crashes | sig1=count1, sig2=count2, . . . sigN=countN | List of crash signatures and counts |
| Multiple | Average | Memory Usage | app1=bytes1, app2=bytes2, . . . appN=bytesN | List of apps and their average memory usage |

FIG. 4

COLLECTION AND AGGREGATION OF DEVICE HEALTH METRICS

BACKGROUND

Providers of wireless devices are generally motivated to ensure that the devices perform in a technically predictable and reliable way. For some devices, such as mobile phones, it may be possible to do limited testing of battery performance in a laboratory environment. For example, battery consumption may be monitored for a device in different modes of operations (e.g., during a voice call, during browser use, etc.). However, other aspects of wireless device performance may not be easily recreated or tested in a laboratory environment. For example, general laboratory testing environments are not well-suited for testing device performance across a wide range of use conditions.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 4 is a table illustrating example device health metrics and corresponding data types in accordance with one or more example embodiments of the disclosure.

DETAILED DESCRIPTION

Overview

Figure 1:
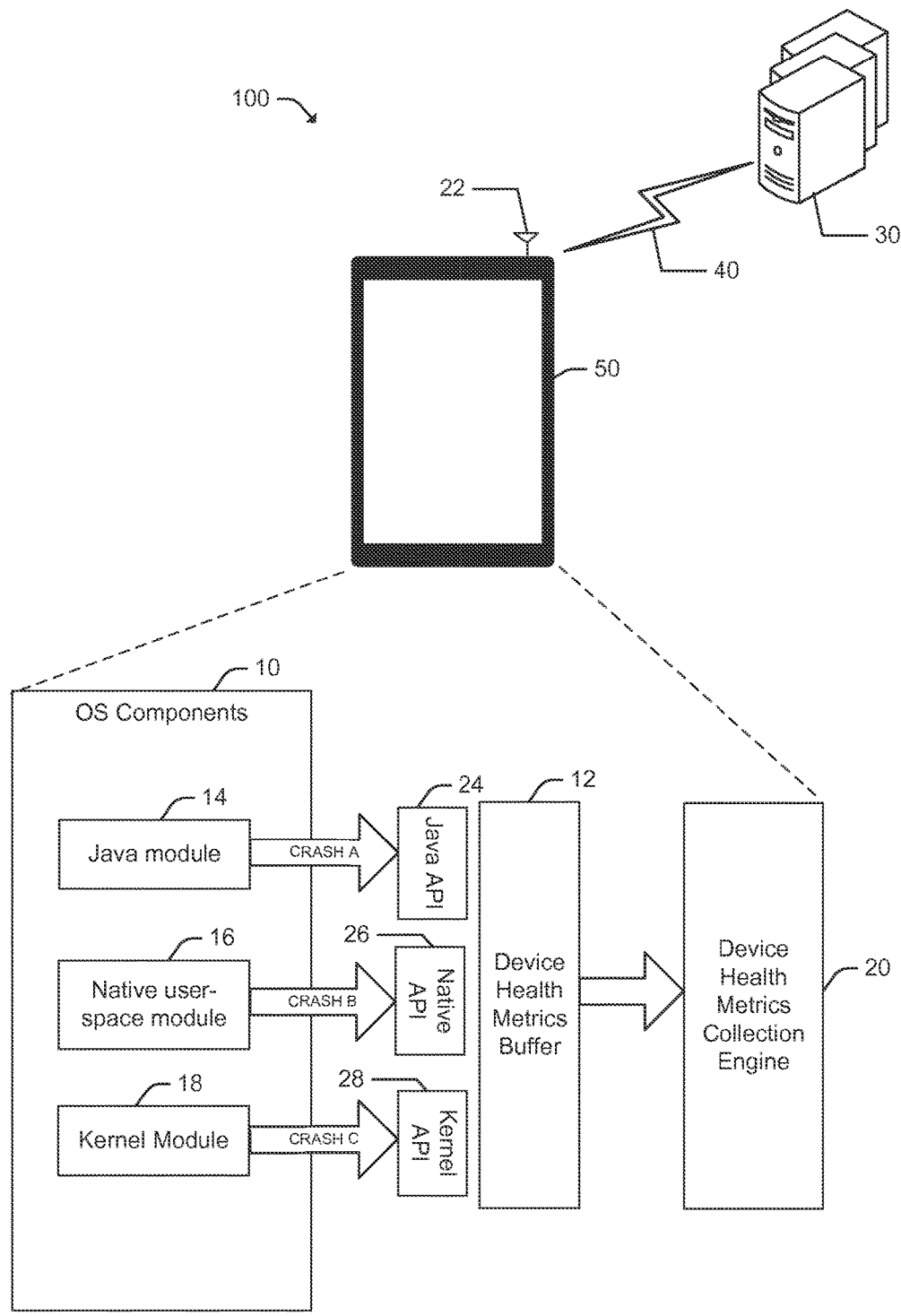
FIG. 1 is a schematic hybrid system, process, and data flow diagram illustrating a system architecture that enables collection and aggregation of device health metrics on a device in accordance with one or more example embodiments of the disclosure.

Device metrics include data pertaining to various events that may occur on a device such as, for example, a number of processes that crash or are terminated, a number of bytes transferred over a network over some period of time, battery consumption data over some period of time, and so forth. Device metrics data may be captured on a device and sent to one or more device client metrics servers where aggregation typically occurs. Device logs, on the other hand, are full software logs recorded on each device that may get uploaded to a server on demand and on a per data source name (DSN) basis. Example embodiments disclosed herein provide various technological improvements including, but not limited to, lower overhead per metrics write, reduced risk of channel spamming during transmission of metrics data, low bandwidth usage to meet certain wide area network (WAN) carrier requirements, and avoiding a need for custom aggregation for each device or device type.

This disclosure relates to, among other things, systems, methods, computer-readable media, techniques, and methodologies for collecting and aggregating health metrics for an electronic device, such as a smartphone, a tablet, an e-reader, or a laptop. One example embodiment is a method for aggregating device health metrics on such electronic devices. The method may include determining the occurrence of a crash event by the device and recording the crash event and metadata identifying the crash event in buffer storage on the device. A crash or crash event may include an exception, error, failure, or the like occurring in an application or process that may cause the application or process to terminate prematurely without manual intervention. In certain example embodiments, a crash or crash event may include an exception, error, failure, or the like that causes an application or process to cease to function in an expected manner, in which case, an option may be presented to a user to force close or otherwise terminate the application or process. A crash event may occur in user space or in the kernel space of a device, depending on whether the crash event is associated with execution of kernel code of an application or execution of user code of the application. Examples of crash events may include application crashes, kernel crashes, kernel panics, excessive use of memory by an application or process, and so forth. While crash events may be described herein in example embodiments, other failure events may also occur on a device and device health metrics data may be collected and aggregated for such other failure events. Examples of other types of failure events may include, without limitation, excessive battery drain (e.g., battery consumption in excess of a baseline amount of battery consumption). The crash event metadata can include crash details such as a crash type, a crash time, an identification of a component that caused the crash event and a state of the device when the crash event occurred. The method can also include grouping two or more crash events based on a crash type, and generating device health metrics data including the grouping of the two or more crash events and metadata corresponding to the two or more crash events. The device health metrics data may be temporarily stored in buffer storage on the device to prevent data loss upon a system crash or a sudden loss of battery power. The method can also include sending device health metrics data and device identification information corresponding to an identification of the device to a server for further aggregation. The method can also include adjusting the size of the device health metrics data being sent based on a configuration file on the device. For example, the method may include compressing the device health metrics data before sending to the server for further aggregation. The configuration file may be updated periodically on the device.

The method can also include determining a level of severity of the crash event based upon the state of the device such as, for example, whether the device is in an active state or a sleep state. A level of severity of a crash event may also be based on whether a user is interacting with an application or process when the application or process crashes, whether the application or process is running in the foreground or background, and so forth. The method can also include generating a metrics report including the device health metrics data, and displaying the metrics report to a user on a dashboard. The method can also include a self-healing aspect where the device may terminate, based on performance over a predetermined period of time, one or more components that cause the crash event or in some instances debug the component that caused the crash event. In addition to the device health metrics data, the method may also include recording other device metrics such as the total number of bytes transferred by the device over a wireless network, a boot time of the device every time the device is booted, a screen time for each application on the device, and the amount of memory used by each application on the device.

Another example embodiment is a device configured to collect and aggregate device health metrics data on the device before sending the device health metrics data to a server for further aggregation. The device may be configured to determine the occurrence of a crash event, and record the crash event along with the metadata corresponding to the crash event in buffer storage on the device. The metadata can include a crash type, a crash time, an identification of a component that caused the crash event, and a state of the device when the crash event occurred. The device can also be configured to group two or more crash events based on the crash type, and generate device health metrics data including the grouping of the two or more crash events and metadata corresponding to the two or more crash events. The device can further be configured to generate device health metrics data including the device metrics data and device identification information, and send the device health metrics data to a server for further aggregation. Crash events can include any failure event that may occur on the device or any abnormalities on the device including but not limited to frame drops, application crashes, kernel crashes, termination of processes due to excessive memory usage (e.g., low memory kills), and excessive battery drains. The device may also be configured to record a crash time, a frequency of the crash event, or a number of crashes per active CPU usage. Device information can include a device serial number, a device type, a device clock time, and a software version of the device.

According to certain example embodiments, the device may be configured to determine a level of severity of the crash event based at least in part on a state of the device, which can include an active state and a sleep state, or based on whether a user is viewing an application when the application crashes. The device may also be configured to generate a metrics report based on the device health metrics data for display on a dashboard. The device may include a self-healing aspect where it may debug the component that caused the crash event, or in some instances terminate the component that caused the crash event based on performance of the component over a predetermined period of time. In addition to aggregating the device health metrics internally, the device may be configured to record total number of bytes transferred by the device over a wireless network, a boot time of the device when the device is booted, a screen time for each application on the device, and the amount of memory used by each application on the device. The device may modify the size of the device health metrics data based on a configuration file, such as compressing the device health metrics data before sending to a server for further aggregation. The configuration file may be downloaded from a server and updated on the device from time to time.

Another example embodiment is a system of one or more servers configured to receive device health metrics data from multiple devices and aggregate the device health metrics data based on the type of the device, a software version running on the device, or a type of crash event. Device health metrics provided by the devices can include device identification information such as a device serial number, a device type, a device clock time, and a software version of the device. The crash event metadata generated by the device can include a crash type, a crash time, an identification of a component that caused the crash event, and a state of the device when the crash event occurred. Crash events can include any failure event that may occur on the device or any abnormalities on the device including but not limited to frame drops, application crashes, kernel crashes, termination of processes due to excessive memory usage (e.g., low memory kills), and excessive battery drains. Based on the device health metrics data collected from multiple devices, the server system may determine a frequency of a type of crash event, or a number of crashes per type of device, or a number of crashes per active CPU usage.

Example systems, methods, and devices described herein provide an on-device health metrics collection agent or engine that can aggregate device health metrics on the device before sending it to a server for further aggregation. Certain example embodiments provide technical features such as aggregation of failure events on the device, serialization of the aggregation work on the server-side, serialization of the visualization work on the server-side, allowing variable verbosity for logging certain events, preventing data loss during unexpected device shutdown or crashes, and reducing data bandwidth sufficient to allow regular uploads through WAN.

Example embodiments provide certain technical features such as creating generic aggregation and visualization techniques such that if new metrics are implemented and passed-on to the on-device metrics collection agent or engine, then customization may not be required on the server-side to aggregate the data. Example embodiments may also perform aggregation per device without requiring custom map-reduce jobs, lower overhead on the device in terms of power, performance and memory, lower bandwidth usage, spam-proofing for the device client metrics channel, and higher reliability than the device client metrics channel due to the use of an on-device database. According to one or more example embodiments, the devices may sense serious health issues in terms of stability, performance, and power that may degrade the user experience by comparing health metrics data with a table of known symptoms. Example systems, methods, and devices can also take appropriate diagnostic actions based on known health issues to ensure that enough artifacts are collected and sent back to the server to root-cause and, for example, fix those issues in future versions of the software. The systems, methods and devices may also take appropriate self-healing actions based on known health issues to mitigate the user impact of those issues.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Embodiment

FIG. 1 is a schematic hybrid system, process, and data flow diagram illustrating an example system 100 for collecting and aggregating device health metrics in accordance with one or more example embodiments of the disclosure. User device 50 may include any computing device including, but not limited to, a mobile device such as a smartphone, tablet, e-reader, wearable device, or the like; a desktop computing device; a laptop computing device; and so forth. The user device 50 may include one or more processors, one or more memories, one or more displays, one or more input/output ("I/O") interfaces, and one or more network interfaces. The processor may comprise one or more cores and may be configured to access and execute at least in part instructions stored in the one or more memories. The one or more memories comprise one or more computer-readable storage media ("CRSM"). The one or more memories may include, but are not limited to, read-only memory ("ROM"), random access memory ("RAM"), flash RAM, magnetic media, optical media, and so forth. The one or more memories may be volatile in that information is retained while providing power or non-volatile in that information is retained without providing power.

The one or more network interfaces may provide for the transfer of data between the user device 50 and another device directly such as in a peer-to-peer fashion, via a network, or both. The network interfaces may include, but are not limited to, personal area networks ("PANs"), wired local area networks ("LANs"), wireless local area networks ("WLANs"), wireless wide area networks ("WWANs"), and so forth. The network interfaces may utilize acoustic, radio frequency, optical, or other signals to exchange data between the user device 50 and another device such as an access point, a host computer, a server, another user device 50, and the like. User device 50 may include one or more radio devices 22, such as antennas, to communicate with one or more servers via one or more communication networks.

According to one example embodiment, a user device 50 may be configured to communicate with one or more back-end servers 30 via one or more networks 40. For example, the user device 50 may make one or more server calls to the back-end server(s) 30 via the network(s) 40. The network(s) 40 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, the network(s) 40 may have any suitable communication range associated therewith and may include, for example, global networks (e.g., the Internet), metropolitan area networks (MANs), wide area networks (WANs), local area networks (LANs), or personal area networks (PANs). In addition, the network(s) 40 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The one or more memories may store instructions for execution by the processor to perform certain actions or functions. These instructions may include an operating system module with operation system components 10 configured to manage hardware resources such as the I/O interfaces and provide various services to applications or modules executing on the processor. The one or more memories may also store one or more Java modules 14, one or more native user-space modules 16, and one or more kernel modules 18. The one or more memories may also store one or more Java APIs 24, one or more native APIs 26, and one or more kernel APIs 28 to monitor and report failure events, such as crashes, from the one or more Java modules 14, one or more native user-space modules 16, and one or more kernel modules 18, respectively. Crash events can include any failure event that may occur on the device or any abnormalities on the device including but not limited to frame drops, application crashes, kernel crashes, termination of processes due to excessive memory usage (e.g., low memory kills), and excessive battery drains. The Java APIs 24, native APIs 26, and kernel APIs 28 may collectively be referred to as the vitals APIs hereinafter. While described as individual modules herein, it is understood that the functions and operations of various modules may be merged, distributed, and so forth.

The one or more memories may also include a device health metrics buffer 12, which may store or record information relating to failure events, such as crashes, detected at the one or more Java modules 14, one or more native user-space modules 16, and one or more kernel modules 18 by the one or more Java APIs 24, one or more native APIs 26, and one or more kernel APIs 28, respectively. The one or more memories may also include a device health metrics collection engine 20 that may access the device health metrics buffer 12 from time to time.

According to one example embodiment, the device health metrics collection agent or engine 20 may be written as a user-space native service, such that the performance and memory overhead can be lower than Java. Additionally, having the device health metrics collection agent or engine 20 above the HAL layer may save duplication for each kernel. A large amount of events to be recorded by the device health metrics collection agent or engine 20 can be in native user-space code. The device health metrics collection agent or engine 20 may be configured to record vitals events from Java, kernel and user-space, aggregate vitals events, emit metrics with aggregate vitals data, and manage persistence of the vitals data by periodically writing to a local database. As described herein, the terms vitals and device health metrics may be interchangeably used. The device health metrics collection agent or engine 20 may recover data through unexpected shutdown and crashes by writing to the device health metrics buffer 12. The device health metrics collection agent or engine 20 may also adjust the verbosity of the metrics emitted based on a configuration file on-device, receive and update the configuration file from the server, and compress the data before sending it through the device client metrics channel, for example.

As described herein, the terms vitals and device health metrics may be interchangeably used. The vitals application program interfaces (APIs) 24, 26, 28 may include a Log_Counter function which may, for example, record an event of the counter type, with one or more arguments including an identifier of the vital, for example ANR (application not responding), an index key for the event which may provide the secondary grouping of the event, for example application name, a counter value, a unit for the count, a screen state including an active state and a sleep state. The vitals APIs 24, 26, 28 may also include a Log_Timer function to record an event of the timer type, with one or more arguments including an identifier of the vital, for example application launch time, an index key for the event which may provide the secondary grouping of the event, for example application name, a timer value (e.g. 600), a unit (e.g. millisecond), and a screen state of the device including an active state and a sleep state.

According to one example embodiment, the vitals APIs may be duplicated in kernel space, native user space, and Java™. The transfer of data from the API call to the device health metrics collection agent or engine may happen through a vitals buffer 12, which may be a separate buffer to transfer raw vitals events from the various platform software modules to the device health metrics collection engine 20. The content therein may be accessible through the host command line, for example. The use of a logcat may provide a buffer that can handle concurrency and may be accessible from kernel space, native user space, and/or Java. A logcat may be a logging system that provides a mechanism for collecting and viewing system debug outputs. Logs from various applications and portions of the system may be collected in a series of circular buffers, which then can be viewed and filtered by the logcat command.

Vitals APIs 24, 26, and 28 may write to the device health metrics buffer 12 and the user-space device health metrics collection engine 20 may read from the buffer either on a real time basis or near real time basis or periodic basis. In some instances, data loss can occur due to kernel buffer overflow, or when the device health metrics collection agent crashes, or the kernel crashes, or there is an unintentional reboot, or when a device hangs or freezes, or there is premature draining of the battery resulting in an empty battery shutdown. To avoid losing the vitals data in such circumstances, a SQLite database may be used. SQLite may include a software library that may implement a self-contained, server-less, zero-configuration, transactional structured query language (SQL) database engine. The device health metrics collection engine 20 may read the vitals buffer 12 and store its content in a file. Periodically, or in real time or near real time the file may be written to a SQLite database where a first level of aggregation may occur. In the event of a user-space crash, the buffer (which may be located in the kernel space) may remain intact. However, in the event of a kernel crash, for example, the device may recover the contents of the buffer after a reboot.

Turning now to the device metrics server and the services provided by the device metrics server, the device metrics server 30 may receive device health metrics data from multiple devices along with device identification information such as DSN, software version of the device, and type of device, for example. The device metrics server 30 may then authenticate one or more of the devices based at least in part on the device identification information. Once authenticated, the device metrics server 30 may anonymize the device health metrics data collected by removing at least a portion of the device identification information. The device metrics server may further be configured to filter, transform and aggregate the metrics from the one or more devices that are authenticated to the server. Metadata accompanying each collected metric may dictate the data transformation into supported visualization templates. The device metrics server 30 may compute aggregate values for sum, average, min, max and standard deviation for each metric, and transform metrics into, for example, optional user-defined distribution buckets. The device metrics server 30 may perform multiple levels of aggregation depending on the type of metrics report to be generated. The first may be device level aggregation, where all metrics events for each device over a given time window may be aggregated. The second may be the report level aggregation, which may further aggregate the device level metrics into combinations of one or more of date, device type, software version, device pool, time window, for example, daily or weekly.

Illustrative State Machine-Based Architecture and Operation

Figure 2:
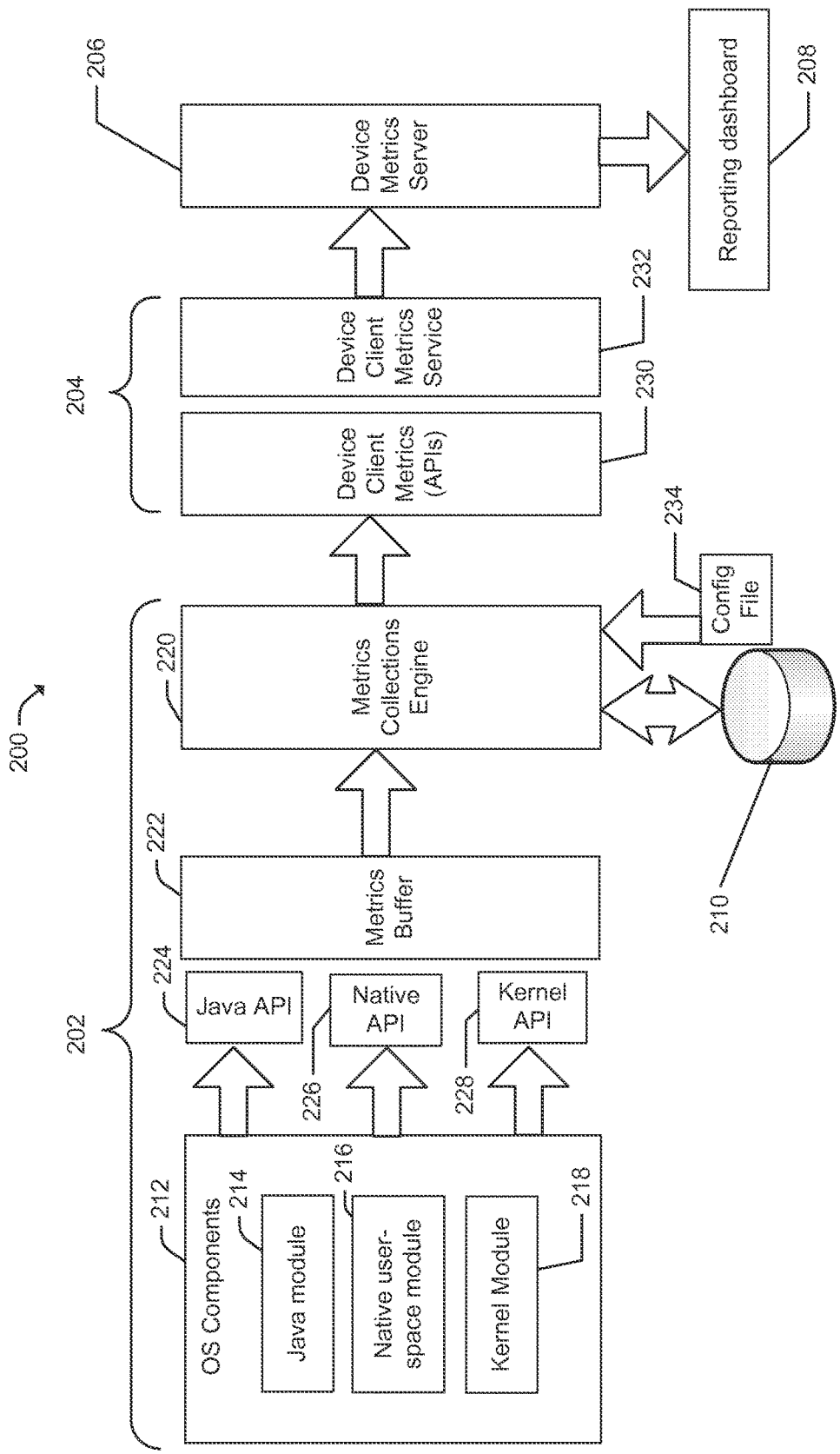
FIG. 2 is a schematic hybrid system, process, and data flow diagram illustrating data flows between various components of a system architecture that enables collection and aggregation of device health metrics in accordance with one or more example embodiments of the disclosure.

FIG. 2 is a schematic hybrid system, process, and data flow diagram illustrating an example system 200 for collecting and aggregating device health metrics data in accordance with one or more example embodiments of the disclosure. User device 202 may comprise one or more processors, one or more memories, one or more displays, one or more input/output ("I/O") interfaces, and one or more network interfaces. The processor may comprise one or more cores and may be configured to access and execute at least in part instructions stored in the one or more memories. These instructions may include an operating system module with operation system components 212 configured to manage hardware resources such as the I/O interfaces and provide various services to applications or modules executing on the processor. The one or more memories may also store one or more Java modules 214, one or more native user-space modules 216, and one or more kernel modules 218. The one or more memories may also store one or more Java APIs 224, one or more native APIs 226, and one or more kernel APIs 228 to monitor and report failure events, such as crashes, from the one or more Java modules 214, one or more native user-space modules 216, and one or more kernel modules 218, respectively. Crash events can include any failure event that may occur on the device or any abnormalities on the device including but not limited to frame drops, application crashes, kernel crashes, termination of processes due to excessive memory usage (e.g., low memory kills), and excessive battery drains. The Java APIs 224, native APIs 226, and kernel APIs 228 may collectively be referred to as the vitals APIs hereinafter. While described as individual modules herein, it is understood that the functions and operations of various modules may be merged, distributed, and so forth.

The one or more memories may also include a device health metrics buffer 222, which may store or record information relating to failure events, such as crashes, detected at the one or more Java modules 214, one or more native user-space modules 216, and one or more kernel modules 218 by the one or more Java APIs 224, one or more native APIs 226, and one or more kernel APIs 228, respectively. The one or more memories may also include a device health metrics collection engine 220 that may access the device health metrics buffer 222 from time to time.

According to one example embodiment, the device health metrics collection agent or engine 220 may be written as a user-space native service, such that the performance and memory overhead can be lower than Java. Additionally, having the device health metrics collection agent or engine 220 above the HAL layer may save duplication for each kernel. A large amount of events to be recorded by the device health metrics collection agent or engine 220 can be in native user-space code. The device health metrics collection agent or engine 220 may be configured to record vitals events from Java, kernel and user-space, aggregate vitals events, emit metrics with aggregate vitals data, and manage persistence of the vitals data by periodically writing to a local database. As described herein, the terms vitals and device health metrics may be interchangeably used. The device health metrics collection agent or engine 220 may recover data through unexpected shutdown and crashes by writing to the device health metrics buffer 222. The device health metrics collection agent or engine 220 may also adjust the verbosity of the metrics emitted based on a configuration file 234 on device. The device health metrics collection agent or engine 220 may receive and update the configuration file 234 from a server 210, and compress the data before sending it through the device client metrics channel 204, for example. More details on the configuration file 234 and exchange with server 210 will be explained in further detail in later embodiments, which are purely exemplary and not limiting in any manner.

As described herein, the terms vitals and device health metrics may be interchangeably used. The vitals application program interfaces (APIs) 224, 226, 228 may include a Log_Counter function which may, for example, record an event of the counter type, with one or more arguments including an identifier of the vital, for example ANR, an index key for the event which may provide the secondary grouping of the event, for example application name, a counter value, a unit for the count, a screen state including an active state and a sleep state. The vitals APIs 224, 226, 228 may also include a Log_Timer function to record an event of the timer type, with one or more arguments including an identifier of the vital, for example application launch time, an index key for the event which may provide the secondary grouping of the event, for example application name, a timer value (e.g. 600), a unit (e.g. millisecond), and a screen state of the device including an active state and a sleep state. According to one example embodiment, the vitals APIs may be duplicated in kernel, native and Java. The transfer of data from the API call to the device health metrics collection agent or engine may happen through the vitals buffer 222, which may be a separate logcat buffer to transfer raw vitals events from the various platform software modules to the device health metrics collection engine 220. The content therein may be accessible through the host command line. The use of a logcat may provide a circular or ring-buffer that can handle concurrency and may be accessible from kernel, native user space native, and Java.

Vitals APIs 224, 226, and 228 may write to the device health metrics buffer 222 and the user-space device health metrics collection engine 220 may read from the buffer either on a real time basis or near real time basis or periodic basis. In some instances, data loss can occur due to kernel buffer overflow, or when the device health metrics collection agent crashes, or the kernel crashes, or there is an unintentional reboot, or when a device hangs or freezes, or there is premature draining of the battery resulting in an empty battery shutdown. To avoid losing the vitals data, a SQLite database may be used. The device health metrics collection engine 220 may read the vitals buffer 222 and store its content in a file. Periodically, or in real time or near real time the file may get written to a SQLite database where a first level of aggregation may occur. In the event of a user-space crash, the buffer, which may be in the kernel space, remains intact. However, in the event of a kernel crash, the device may recover the content of the buffer after a reboot.

According to certain example embodiments, the device health metrics collection engine 220 may emit metrics through a device client metrics (DCM) channel 204 with aggregate vitals data and metadata as specified by the common data format specification described in the above example embodiments. All metrics emitted by the device health metrics collection engine 220 may be sent through a high-priority DCM channel 204 including for example one or more device client metrics APIs 230 and one or more device client metrics services 232. DCM data can be compressed to allow the traffic to go through WAN. According to one example embodiment, the device health metrics collection engine 220 may periodically send a heartbeat to a device metrics server 206 with information including, for example, a heartbeat sequence number, total number of metrics sent since the last heartbeat, the number of device health metrics collection engine crashes, and the number of buffer overruns. One of the goals of the heartbeat may be to provide device metrics server 206 with an artifact of the existence of a device health metrics collection engine instance. However, the heartbeat can include troubleshooting information as described above. It should be noted, however, that by virtue of using the DCM channel, data including the DSN, device clock time, and software version may already be included in the metadata for the metric.

According to one example embodiment, the heartbeat may be sent every hour of active use of the device, but the device does not have to wake-up for sensing or sending a heartbeat. The SQLite database may include vitals data aggregated at the highest verbosity level supported. The database may be purged periodically because keeping older data on the device for longer may only consume flash and not be useful once uploaded to the device metrics server. The period of database read and metrics upload may be set to a fixed period of time and may be updated to a parameter from the configuration file 234 as described in the following embodiments.

The configuration file 234 may control the verbosity of the device health metrics collection engine 220 as it may have a set of default values and it may get updated through the DCM server 206 for changing the parameters listed above to concentrate on specific vitals and get more verbose information from them, either from a specific device for targeted debugging or from a group of devices for systemic issues.

According to one example embodiment, device health metrics data emitted by the device health metrics collection engine 220 may be normalized. In one example, the counts may be sent to device metrics server 206 as a pair of count and CPU up-time during which the count occurred so that device metrics server 206 can derive the counts/hour. Timers may be sent to the device metrics server 206 as a pair of sum of timers and number of events so that device metrics server 206 can derive the average timer value. When specified by the API caller, the data may be split between screen-on and screen-off by the device health metrics collection engine 220 which may then send two separate aggregated metrics to the device metrics server, one for screen-on and one for screen-off.

According to one or more example embodiments, one or more device health related metrics reported to the server, such as frame drops, application crashes, application not responding (ANR), termination of processes due to excessive memory usage (e.g., low memory kills), provide a general overview of the device health state and help identify issues in a beta pool and in the field. It has been observed, however, that correlation exists in different health metrics. For example, a device that would drop frame under memory pressure would also drop frames under repetitive app crashes. Understanding these correlations may be beneficial as they would help root cause bad behaviors in devices. A failure event may include, for example, a crash event associated with the client application, a failure event on the user device on which the client application is executing that causes the client application to cease functioning in an expected manner, a reboot of the user device, and so forth.

According to one or more example embodiments, the device may not only report bad device events but also react appropriately to such events. Bad events may include, for example, excessive frame drops, excessive battery drain, excessive low memory kill triggering, and repeated crashes. Corresponding actions that may be taken by the device to fix these bad events may include triggering systrace captures and uploading logs, triggering a batterstats report, collecting additional memory data, and terminating offending processes or blacklisting or delaying application restarts, respectively. According to one example embodiment, this may be achieved by adding a rule-based framework in the device health metrics collection agent such that when the collection agent processes certain events, the rule-based framework may check these events against current rules, and if all criteria specified by the rules are met, the corresponding actions may be triggered.

According to one example embodiment, these rules can be updated dynamically via a device configuration file 234. A configuration file 234 can be used to control collection agent behavior. Examples of such parameters may include heartbeat frequency, logging verbosity, and signature table rules. Different rules can apply to different device groups. Example systems, methods, and devices disclosed are able to update data collection and self-healing reactions in real time or near real time.

Turning now to the device metrics server and the services provided by the device metrics server, the device metrics server 206 may receive device health metrics data from multiple devices. The device metrics server may be configured to filter, transform and aggregate the metrics from one or more devices. Metadata accompanying each collected metric may dictate the data transformation into supported visualization templates, and the device health metrics data aggregated by the server 206 may be presented to a user on a reporting dashboard 208. The device metrics server 206 may compute aggregate values for sum, average, min, max and standard deviation for each metric, and transform metrics into, for example, optional user-defined distribution buckets. The device metrics server 206 may perform multiple levels of aggregation. For example, the first may be device level aggregation, where all metrics events for each device over a given time window may be aggregated. The second may be the report level aggregation, which may further aggregates the device level metrics into combinations of one or more of date, device type, software version, device pool, time window, for example, daily or weekly.

According to certain example embodiments, composite metrics may be computed from multiple metrics. A standard set of views and templates may be used to report metrics data. For example, a trend view and a drilled down distribution view may be used on the dashboard 208. For all metrics, the reporting dashboard 208 may allow device owners to set configuration properties to customize the reports and metric aggregation. These configurations may include, for example, a metric identifier, data grouping, single or multiple, aggregate function, sum or average, default and customizable axes and labels. The dashboard 208 may also provide the capability to define guards or baselines, which may be used to provide visual cues on the charts and for alarms or notifications on the device.

Figure 3:
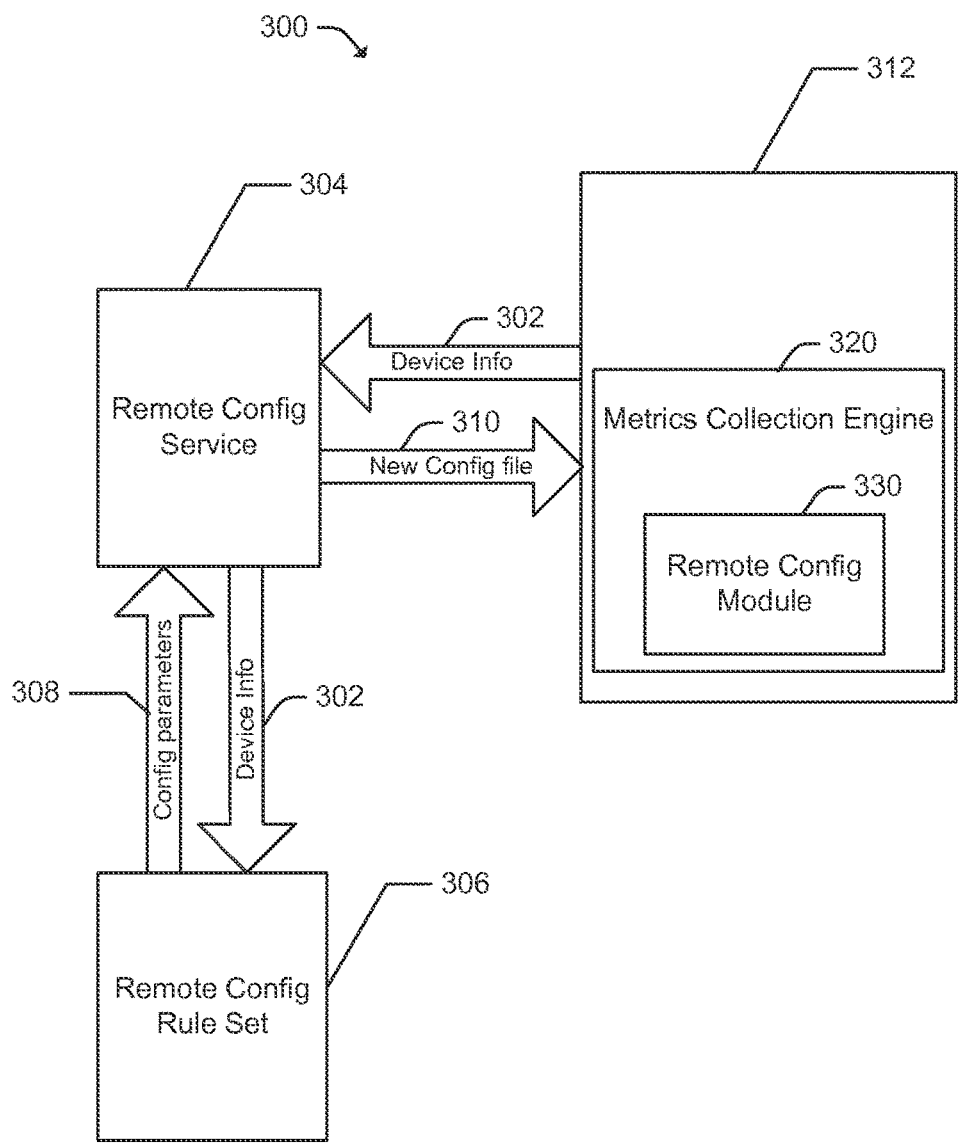
FIG. 3 is a schematic hybrid system, process, and data flow diagram illustrating exchange of device information, configuration parameters, and configuration file(s) between a device and a remote configuration service in accordance with one or more example embodiments of the disclosure.

Turning now to FIG. 3, illustrated is an example system 300 for updating the configuration file on a device 312, according to one or more example embodiments. User device 312 may include a remote configuration module 330 within the metrics collection engine 320 that may periodically receive and update the configuration file on the device 312. System 300 may enable an internal service that may provide remote management of application configuration through a web service. System 300 may also allow user segmentation rules to push configuration based on user type, for example.

System 300 may include a remote configuration service 304, which may provide (hypertext transfer protocol) HTTP service APIs that the metrics collection agent or engine 320 can use directly instead of going through a Java software development kit (SDK). The remote configuration module in the metrics collection agent or engine 320 may send direct HTTP requests to the remote configuration service 304 along with the device information 302 and the service may query a remote configuration rule set service 306 to obtain the appropriate configuration parameters 308 and update the metrics collection agent or engine 320 with new settings or new or updated configuration file 310 if necessary. According to one example embodiment, the rule set may be changed any time via a web service console, for example. Metrics collection engine 320 may adjust a size of the device health metrics data collected based on this new or updated configuration file 310 on the device 312.

Turning now to FIG. 4, the table illustrated provides examples of metrics classification 400 that may be used on device 50, 202 and backend server components 30, 206, as illustrated in the previous example embodiments. Each metric 406, for example, can be assigned a classification to enable automatic backend aggregation. Classification may include two or more pieces of information, including for example a data category 402 and an aggregation function 404. An example classification is illustrated in FIG. 4, and as illustrated, the device health metrics data received from one or more devices 50, 202 may be grouped such that the grouping defines whether the metric contains a single data group or series or multiple data groups or series, where each data series may have its own group index or key. An aggregate function 404 may, for example, define the backend aggregate function applied on the metric. Device metric values can be aggregated either by average or sum functions. The device health metrics data may also include example data 408 and their corresponding description 410. Example data 408 may include a total number of bytes transferred by the device over a wireless network, a boot time of the device every time the device is booted, a screen time for each application on the device, or an amount of memory used by each application on the device.

According to one example embodiment, a metric event data structure generated by the device health metrics collection agent or engine 20, 220 may include multiple key value pairs associated with a logical grouping of the metric. Data structures used for reporting a metric may include a JavaScript Object Notation (JSON) map. Aggregating data from two or more crash events may include storing a first identifier of a first process and a first number of crash events as a first key-value pair in the data structure, and storing a second identifier of a second process and a second number of crash events as a second key-value pair in the data structure. For example, a metric event associated with kernel crash may include device metadata and number of times a given process may have crashed between the last metric event upload and a present time. The backend servers 30, 206 may store these metric events after authenticating the one or more devices to the servers and anonymizing the device by removing a portion of the device identification information to preserve customer privacy. The backend servers 30, 206 may also access these stored metric events for a two-step aggregation process, for example. In a first example phase of the aggregation, the backend servers may aggregate the same type of metric events received from a given device for a given time duration, resulting in a single entry for each type of metric event received from a given device. In a second example phase, the backend servers 30, 206 may aggregate the entries of same category across all devices of, for example, the same product line. These aggregated metrics may provide an indication of health of the user devices and thereby quality of the software running on the devices.

According to certain example embodiments, the device health metrics collection agent or engine can aggregate the device health metrics at any given time interval prior to backend data collection. Each aggregated metric data record can include one or more information details such as device information, device serial number (DSN), a device type such as smartphone or tablet, software version of the device, a device clock time, and a metric identifier identifying the metric being recorded. The one or more metric data sets may include an index key for data grouping, such as sum, average, min, max, event count, etc. and the values for sum, average, min, max can be integers or floats. The backend server may be configured to convert and process all values as double precision float or higher.

According to certain example embodiments, composite metrics may be computed from multiple metrics. A standard set of views and templates may be used to report metrics data. For example, a trend view and a drilled down distribution view may be used on the dashboard. For all metrics, the reporting dashboard may allow metric owners to set configuration properties to customize the reports and metric aggregation. These configurations may include, for example, a metric identifier, data grouping, single or multiple, aggregate function, sum or average, default and customizable axis's and labels. The dashboard may also include the ability to define guards or baselines, which may be used to provide visual cues on the charts and for alarms or notifications on the device.

Figure 5:
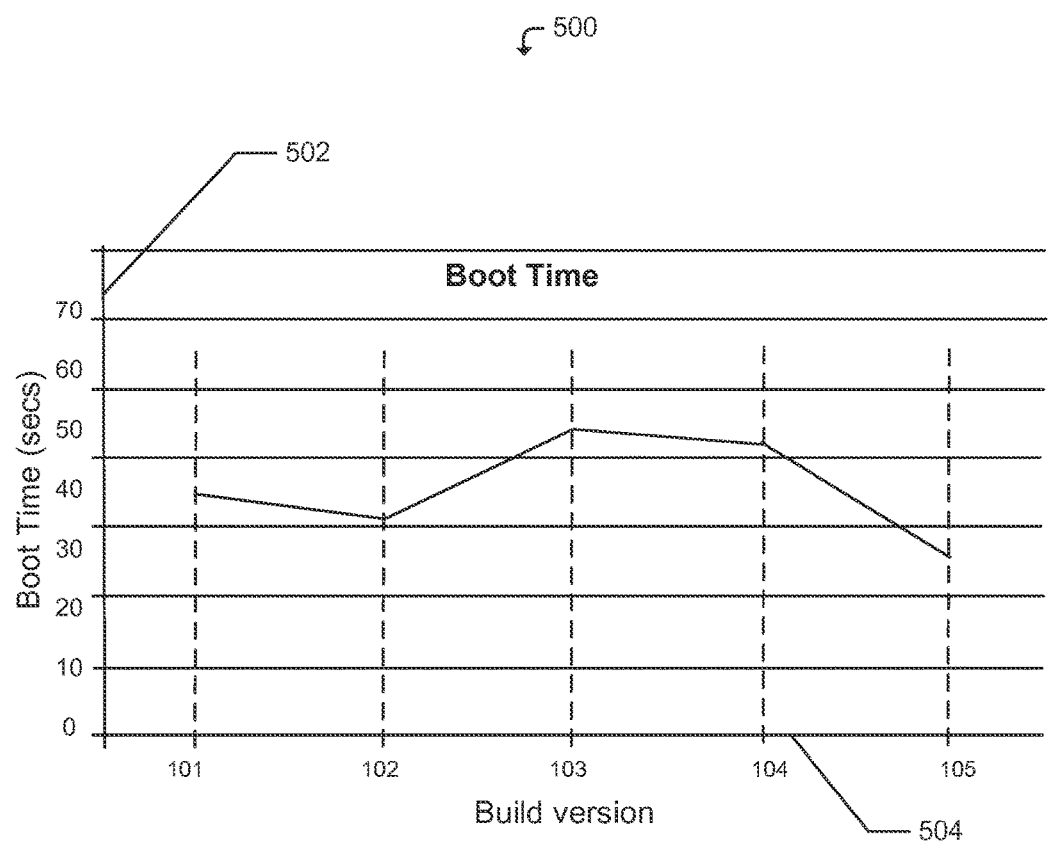
FIG. 5 is a graphical illustration of an example device metric in relation to another parameter in accordance with one or more example embodiments of the disclosure.

According to one example embodiment of the dashboard, the metric trend view 500 may show a metric, such as boot time 502, trending over build version or over time 504, as illustrated in FIG. 5. The chart is configured to plot the aggregated average or sum, min, max, and standard deviation. The user may choose either build versions or time for the X-Axis for trending, and the Y-Axis can be configured to show the metric value or device count. FIG. 5 merely illustrates an example metric trend chart when showing a single data series, according to one or more example embodiments.

Figure 6:
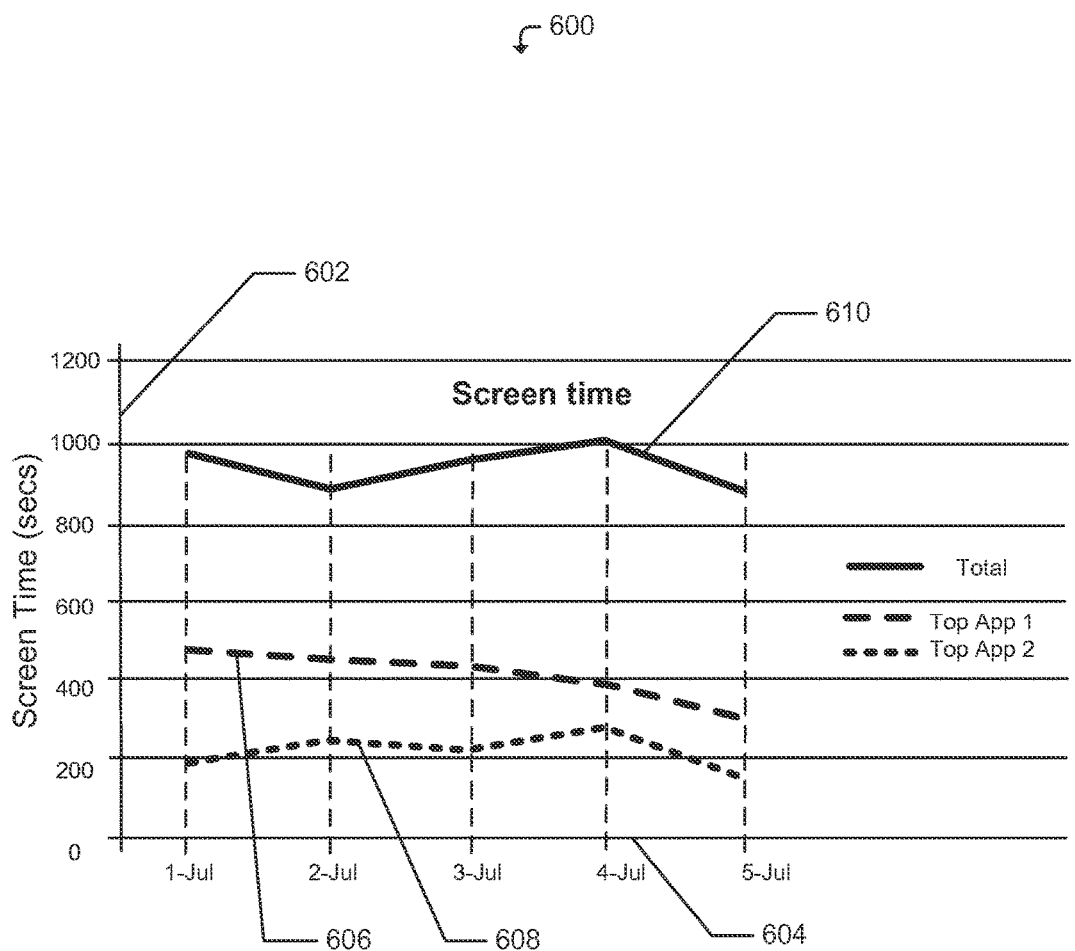
FIG. 6 is a graphical illustration of an example device metric in relation to another parameter in accordance with one or more example embodiments of the disclosure.
Figure 7:
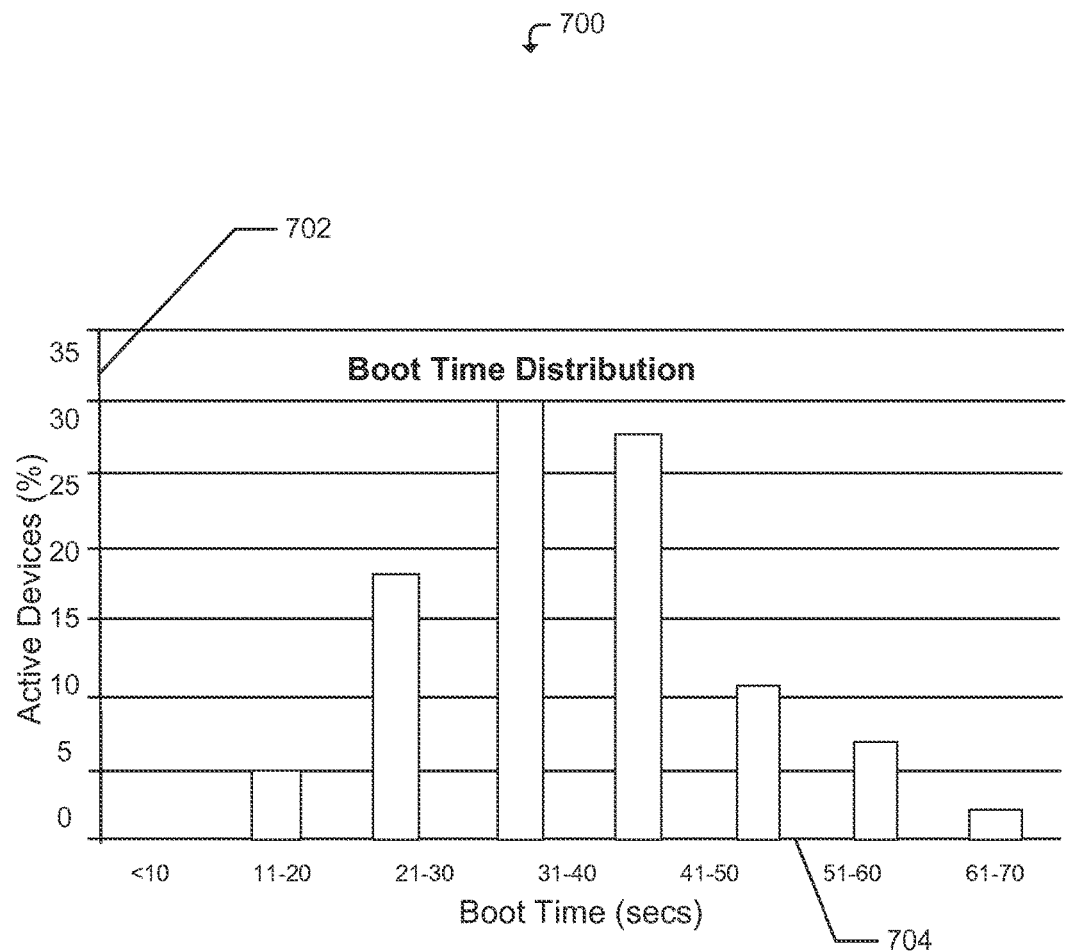
FIG. 7 is a graphical illustration of an example device metric in relation to another parameter in accordance with one or more example embodiments of the disclosure.

FIG. 6 illustrates a view of the dashboard 600 where the user can choose to plot multiple data series for metrics with multiple indexed data series. For example, the user may choose to plot screen time 602 of a first application 606 and screen time of a second application 608 over a predetermined period of time 604. The user may also plot the total screen time 610 that may be a summation of screen times of all applications over a predetermined period of time 604. On the device metrics server 206, the metric distribution view may show a more detailed breakdown of the metrics distribution for a particular data series. For example, as illustrated in FIG. 7, the dashboard 700 may display a histogram showing boot time distribution 704 with the percentage of active devices 702 on Y-axis, and the X-Axis may show the active device count representation, according to one example embodiment.

Illustrative Processes

Figure 8:
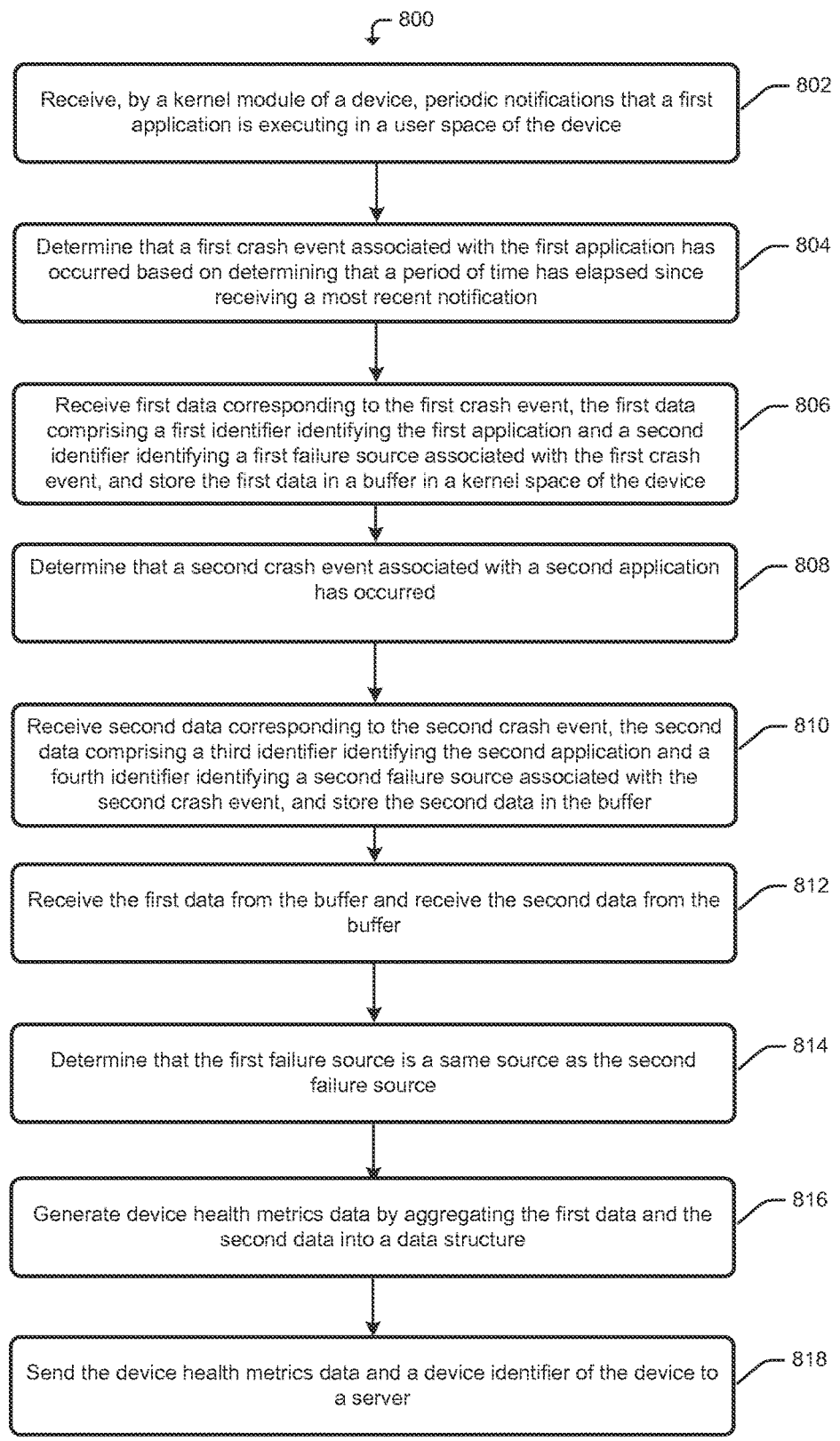
FIG. 8 is a process flow diagram of an illustrative method for collecting and aggregating device health metrics on a device in accordance with one or more example embodiments of the disclosure.

FIG. 8 is a process flow diagram of an illustrative method 800 for collecting and aggregating device health metrics data in accordance with one or more example embodiments of the disclosure. According to one example embodiment, method 800 may include, at block 802, receiving, by a kernel module of a device, periodic notifications that a first application is executing in a user space of the device. The method may include determining that a period of time has elapsed since receiving a most recent notification that the first application is executing in the user space. The method may also include, at block 804, determining, by the kernel module, that a first crash event associated with the first application has occurred based on determining that the period of time has elapsed since receiving the most recent notification. The method may also include, at block 806, receiving first data corresponding to the first crash event, the first data including a first identifier identifying the first application and a second identifier identifying a first failure source associated with the first crash event. The method may also include storing the first data in a buffer in a kernel space of the device. The method may also include, at block 808, determining that a second crash event associated with a second application has occurred. The method may also include, at block 810, receiving second data corresponding to the second crash event, the second data including a third identifier identifying the second application and a fourth identifier identifying a second failure source associated with the second crash event, and storing the second data in the buffer. The method may also include, at block 812, receiving the first data from the buffer, and receiving the second data from the buffer. The method may also include, at block 814, determining that the first failure source is a same source as the second failure source. The method may also include, at block 816, generating device health metrics data by aggregating the first data and the second data into a data structure. Aggregating the first data and the second data may include incrementing a first counter of crash events for the first application based on the first crash event, incrementing a second counter of crash events for the second application based on the second crash event, storing, in the data structure, the first counter in association with the first identifier, and storing, in the data structure, the second counter in association with the second identifier. The method may also include, at block 818, sending the device health metrics data and a device identifier of the device to a server.

The method may also include determining that the first application was executing in a foreground state during the first crash event. The method may also include determining that the second application was executing in a background state during the second crash event. The method may also include determining a first value indicative of a first level of severity of the first crash event. The method may also include associating the first value with the first crash event. The method may also include determining a second value indicative of a second level of severity of the second crash event, a deviation between the first value and a baseline value being greater than a deviation between the second value and the baseline value, the baseline value being associated with execution of the first application and the second application without an exception occurring, and associating the second value with the second crash event.

The method may also include determining that a network connection has been terminated. The method may also include storing a marker indicating a first portion of the device health metrics data that has been sent to the server. The method may also include determining that a new network connection has been established. The method may also include determining, using the marker, a second portion of the device health metrics data, and sending a second portion of the device health metrics data to the server.

The user device, according to this example embodiment, can include one or more Java modules, one or more native user-space modules, and one or more kernel modules. The device may also include one or more Java APIs, one or more native APIs, and one or more kernel APIs to monitor and report failure events, such as crashes, from the one or more Java modules, one or more native user-space modules, and one or more kernel modules, respectively. The user device may store in a buffer, via a call to an API, first data specifying a first number of crash events associated with a first process executing on a device, a first identifier of the first process, and a first device component or device operation associated with the first number of crash events. Crash events can include any failure event that may occur on the device or any abnormalities on the device including but not limited to frame drops, application crashes, kernel crashes, termination of processes due to excessive memory usage (e.g., low memory kills), and excessive battery drains. The Java APIs, native APIs, and kernel APIs may collectively be referred to as the vitals APIs hereinafter. While described as individual modules herein, it is understood that the functions and operations of various modules may be merged, distributed, and so forth.

The user device may store in the buffer, via a call to the API, second data specifying a second number of crash events associated with a second process executing on the device, a second identifier of the second process, and a second device component or device operation associated with the second number of crash events. A device health metrics buffer may store or record information relating to failure events, such as crashes, detected at the one or more Java modules, one or more native user-space modules, and one or more kernel modules by the one or more Java APIs, one or more native APIs, and one or more kernel APIs, respectively. The one or more memories may also include a device health metrics collection engine that may access the device health metrics buffer from time to time.

According to one example embodiment, the device health metrics collection agent or engine may be a user-space native service, such that the performance and memory overhead can be lower than Java. Additionally, having the device health metrics collection agent or engine above the HAL layer may save duplication for each kernel. A large amount of events to be recorded by the device health metrics collection agent or engine can be in native user-space code. The device health metrics collection agent or engine may be configured to record vitals events from Java, kernel and user-space, aggregate vitals events, emit metrics with aggregate vitals data, and manage persistence of the vitals data by periodically writing to a local database. As described herein, the terms vitals and device health metrics may be interchangeably used. The device health metrics collection agent or engine may recover data through unexpected shutdown and crashes by writing to the device health metrics buffer. The device health metrics collection agent or engine may also adjust the verbosity of the metrics emitted based on a configuration file on device, receive and update the configuration file from the server, and compress the data before sending it through the device client metrics channel, for example.

The user device may obtain the first data and the second data from the buffer. The vitals application program interfaces (APIs) may include a Log_Counter function which may, for example, record an event of the counter type, with one or more arguments including an identifier of the vital, for example ANR (application not responding), an index key for the event which may provide the secondary grouping of the event, for example application name, a counter value, a unit for the count, a screen state including an active state and a sleep state. The vitals APIs may also include a Log_Timer function to record an event of the timer type, with one or more arguments including an identifier of the vital, for example application launch time, an index key for the event which may provide the secondary grouping of the event, for example application name, a timer value (e.g. 600), a unit (e.g. millisecond), and a screen state of the device including an active state and a sleep state.

The user device may determine that the first device component or device operation corresponds to the second device component or device operation. According to one example embodiment, the vitals APIs may be duplicated in kernel space, native user space and Java. The transfer of data from the API call to the device health metrics collection agent or engine may happen through a vitals buffer, which may be a separate logcat buffer to transfer raw vitals events from the various platform software modules to the device health metrics collection engine. The content therein may be accessible through the host command line, for example. The use of a logcat may provide a circular or ring-buffer that can handle concurrency and may be accessible from kernel, native user space, and Java.

The user device may generate device health metrics data by aggregating the first data and the second data into a data structure. Vitals APIs may write to the device health metrics buffer and the user-space device health metrics collection engine may read from the buffer either on a real time basis or near real time basis or periodic basis. In some instances, data loss can occur due to kernel buffer overflow, or when the device health metrics collection agent crashes, or the kernel crashes, or there is an unintentional reboot, or when a device hangs or freezes, or there is premature draining of the battery resulting in an empty battery shutdown. To avoid losing the vitals data in such circumstances, a SQLite database may be used. SQLite may include a software library that may implement a self-contained, server-less, zero-configuration, transactional structured query language (SQL) database engine. The device health metrics collection engine may read the vitals buffer and store its content in a file. Periodically, or in real time or near real time the file may get written to a SQLite database where a first level of aggregation may occur. In the event of a user-space crash, the buffer, which may be in the kernel space, remains intact. However, in the event of a kernel crash, the device may recover the contents of the buffer after a reboot.

The user device may generate device health metrics including the device metrics data and device identification information corresponding to an identification of the device. The device health metrics data may be aggregated data including an aggregation of device metrics data collected by the device over a period of time. The user device may send device health metrics data to a server for further aggregation, as described in one or more previous example embodiments.

Figure 9:
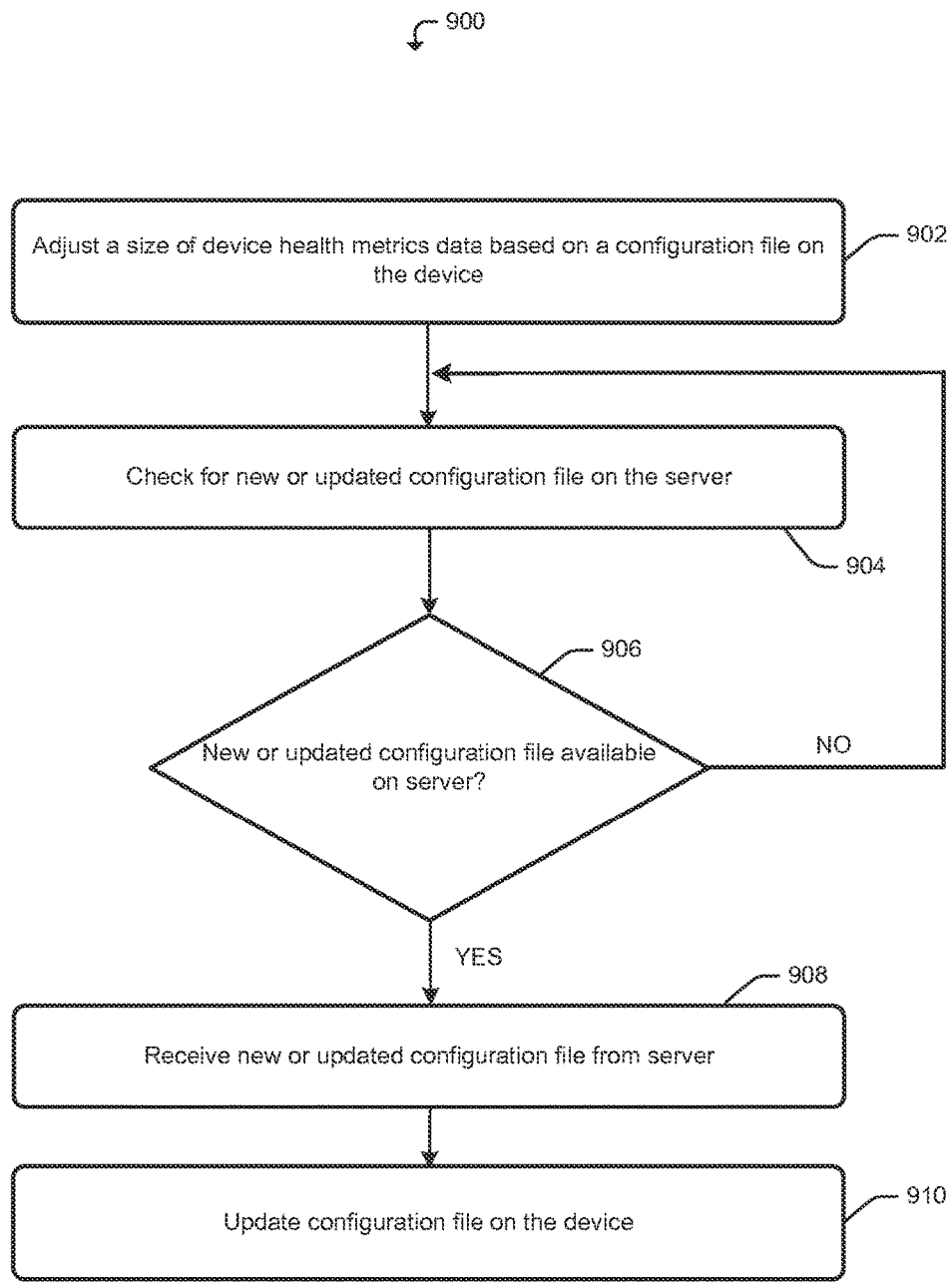
FIG. 9 is a process flow diagram of an illustrative method for adjusting the size of device health metrics data based on a configuration file on a device, receiving a new configuration file from a server, and updating the configuration file on the device in accordance with one or more example embodiments of the disclosure.

FIG. 9 is a process flow diagram of an illustrative method 900 for adjusting a size of the device health metrics data emitted by the user device, according to one or more example embodiments. At block 902, the user device may adjust a size of the device health metrics data based on a configuration file on the device. The user device as described in the above embodiments may include a remote configuration module within the metrics collection engine that may periodically receive and update the configuration file on the device. The method may enable an internal service that may provide remote management of application configuration through a web service. Method may also allow user segmentation rules to push configuration based on user type, for example.

Method may include a remote configuration service, which may provide HTTP service APIs that the metrics collection agent or engine can use directly instead of going through a Java software development kit (SDK). The remote configuration module in the metrics collection agent or engine may send direct HTTP requests to the remote configuration service along with the device information and the service may query a remote configuration rule set service to obtain the appropriate configuration parameters and update the metrics collection agent or engine with new settings or new or updated configuration file if necessary. According to one example embodiment, the rule set may be changed any time via a web service console, for example. Metrics collection engine may adjust a size of the device health metrics data collected based on this new or updated configuration file on the device.

At block 904, the user device may check for a new or updated configuration file on the server. At block 906, if there is a new or updated configuration file available on the server, then at block 908, the user device may receive a new configuration file from a server if the underlying rule set has been changed or updated. At block 910, the user device may update the configuration file on the device based on a new rule set or new configuration file, as described in one or more previous example embodiments. At block 906, however, if a new or updated configuration file is not available on the server, the method 900 flows back to block 904 where the user device checks for a new or updated configuration file with the server.

Figure 10:
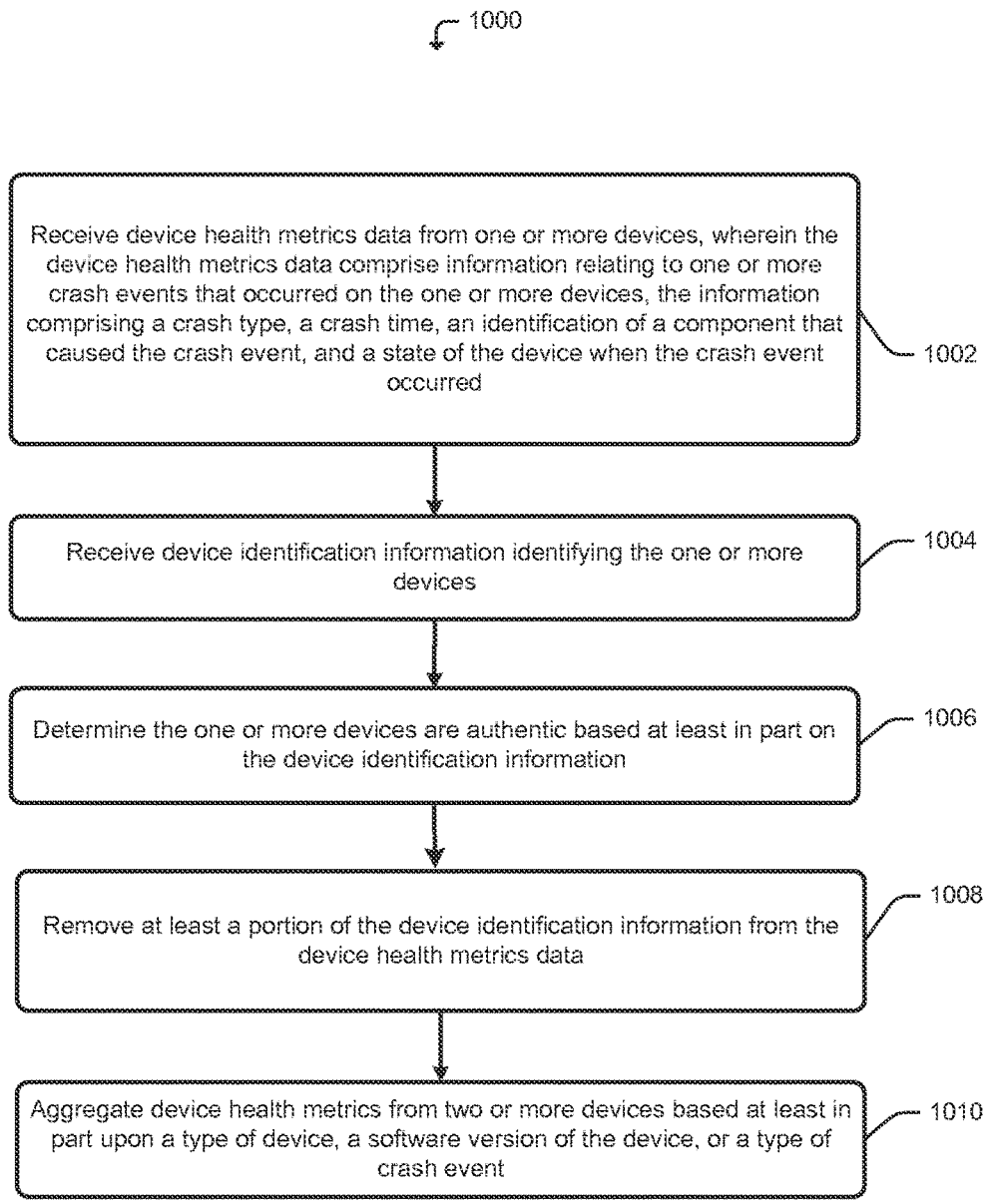
FIG. 10 is a process flow diagram of an illustrative method for aggregating device health metrics obtained from multiple devices on one or more servers in accordance with one or more example embodiments of the disclosure.

FIG. 10 is a process flow diagram of an illustrative method 1000 for collecting and aggregating device health metrics from two or more devices in accordance with one or more example embodiments of the disclosure. According to one example embodiment, method 1000 may include, at block 1002, receiving device health metrics data from one or more devices, wherein the device health metrics data may include information relating to one or more crash events that occurred on the one or more devices. The information can include crash type, a crash time, an identification of a component that caused the crash event, and a state of the device when the crash event occurred. At block 1004, the system server may receive device identification information identifying the one or more devices. At block 1006, the system server may determine the one or more devices are authentic based at least in part on the device identification information. At block 1008, the system server may remove at least a portion of the device identification information from the device health metrics data. At block 1010, the system server may aggregate device health metrics from two or more devices based at least in part upon a type of device, a software version of the device, or a type of crash event.

According to this example embodiment, the device metrics server may receive device health metrics from one or more user devices via one or more networks. Each metric, for example, can be assigned a classification to enable automatic backend aggregation. Classification may include two or more pieces of information, including for example a data category and an aggregation function. The device health metrics data received from one or more devices may be grouped such that the grouping defines whether the metric contains a single data group or series or multiple data groups or series, where each data series may have its own group index or key. An aggregate function may, for example, define the backend aggregate function applied on the metric. Device metric values can be aggregated either by average or sum functions. The device health metrics data may also include example data and their corresponding description. Example data may include a total number of bytes transferred by the device over a wireless network, a boot time of the device every time the device is booted, a screen time for each application on the device, or an amount of memory used by each application on the device.

According to one or more example embodiment, a metric event emitted from the device health metrics collection agent or engine may include multiple key value pairs associated with a logical grouping of the metric. For example, a metric event associated with a kernel crash may include device metadata and a number of times a given process may have crashed between the last metric event upload and a present time. The backend servers may store these metric events after authenticating the one or more devices to the servers and anonymizing the device by removing a portion of the device identification information to preserve customer privacy. The backend servers may also access these stored metric events for a two-step aggregation process, for example. In a first example phase of the aggregation, the backend servers may add up the same type of metric events received from a given device for a given time duration, resulting in a single entry for each type of metric event received from a given device. In a second example phase, the backend servers may aggregate the entries of same category across all devices of, for example, the same product line. These aggregated metrics may provide an indication of health of the user devices and thereby quality of the software running on the devices.

According to certain example embodiments, the device health metrics collection agent or engine can aggregate the device health metrics at any given time interval prior to backend data collection. Each aggregated metric data record can include one or more information details such as device information, device serial number (DSN), a device type such as smartphone or tablet, software version of the device, a device clock time, and a metric identifier identifying the metric being recorded. The one or more metric data sets may include an index key for data grouping, such as sum, average, min, max, event count, etc. and the values for sum, average, min, max can be integers or floats. The backend server may be configured to convert and process all values as double precision float or higher.

The device metrics server may receive device information corresponding to an identification of the one or more devices. Device identification information may include, for example, a device serial number, a device type, or a software version on the device. The device metrics server may aggregate the device health metrics from the two or more devices based on type of device, software version or failure event type, for example, a kernel crash or application crash. Any or all of the aggregated data may be displayed to a user on a dashboard according to one or more user settings, as described in one or more previous example embodiments.

According to certain example embodiments, composite metrics may be computed from multiple metrics. A standard set of views and templates may be used to report metrics data. For example, a trend view and a drilled down distribution view may be used on the dashboard. For all metrics, the reporting dashboard may allow metric owners to set configuration properties to customize the reports and metric aggregation. These configurations may include, for example, a metric identifier, data grouping, single or multiple, aggregate function, sum or average, default and customizable axis's and labels. The dashboard may also include the ability to define guards or baselines, which may be used to provide visual cues on the charts and for alarms or notifications on the device.

Illustrative Device Architecture

Figure 11:
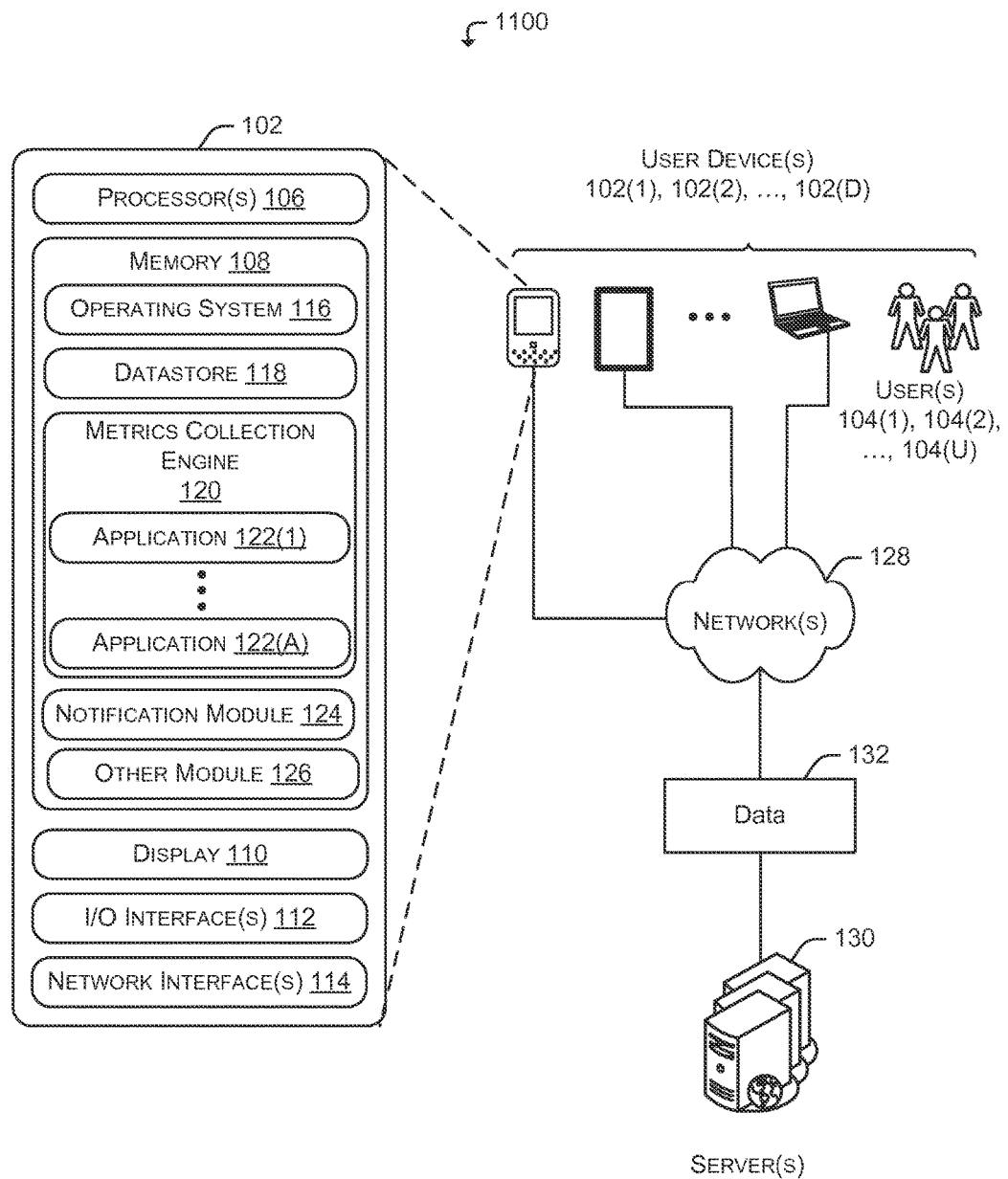
FIG. 11 is an illustrative system architecture that enables collection and aggregation of device health metrics in accordance with one or more example embodiments of the disclosure.

FIG. 11 illustrates a system 1100 for collecting and aggregating device health metrics, according to one or more example embodiments. One or more user devices 102(1), 102(2), . . ., 102(D) may be used by one or more users 104(1), 104(2), . . . , 104(U). As used herein, letters enclosed by parenthesis such as "(D)" indicate an integer having a value greater than zero. The user device 102 may include any suitable computing device including, but not limited to, a mobile device such as a smartphone, tablet, e-reader, wearable device, or the like; a desktop computing device; a laptop computing device; and so forth. The user device 102 may correspond to an illustrative device configuration for the user device 102. The techniques described herein may also be used with other devices, such as embedded devices. The user devices 102 are described in more detail below.

The user device 102 may comprise one or more processors 106, one or more memories 108, one or more displays 110, one or more input/output ("I/O") interfaces 112, and one or more network interfaces 114. The user device 102 may include other devices not depicted, such as global positioning system receivers, cameras, keyboards, and so forth.

The processor 106 may comprise one or more cores and is configured to access and execute at least in part instructions stored in the one or more memories 108. The one or more memories 108 comprise one or more computer-readable storage media ("CRSM"). The one or more memories 108 may include, but are not limited to, random access memory ("RAM"), flash RAM, magnetic media, optical media, and so forth. The one or more memories 108 may be volatile in that information is retained while providing power or non-volatile in that information is retained without providing power.

The one or more displays 110 are configured to present visual information to the user 104. The display 110 may comprise an emissive or reflective display configured to present images. An emissive display emits light to form an image. Emissive displays include, but are not limited to, backlit liquid crystal displays, plasma displays, cathode ray tubes, light emitting diodes, image projectors, and so forth. Reflective displays use incident light to form an image. This incident light may be provided by the sun, general illumination in the room, a reading light, and so forth. Reflective displays include, but are not limited to, electrophoretic displays, interferometric displays, cholesteric displays, and so forth. The one or more displays 110 may be configured to present images in monochrome, color, or both. In some implementations, the one or more displays 110 of the user device 102 may use emissive, reflective, or combination displays with emissive and reflective elements.

The one or more I/O interfaces 112 may also be provided in the user device 102. These I/O interfaces 112 allow for coupling devices such as keyboards, joysticks, touch sensors, cameras, microphones, speakers, haptic output devices, external memories, and so forth to the user device 102. The devices coupled to the I/O interfaces 112 may be configured to generate notifications, such as when data is received from a touch sensor.

The one or more network interfaces 114 provide for the transfer of data between the user device 102 and another device directly such as in a peer-to-peer fashion, via a network, or both. The network interfaces 114 may include, but are not limited to, personal area networks ("PANs"), wired local area networks ("LANs"), wireless local area networks ("WLANs"), wireless wide area networks ("WWANs"), and so forth. The network interfaces 114 may utilize acoustic, radio frequency, optical, or other signals to exchange data between the user device 102 and another device such as an access point, a host computer, a server, another user device 102, and the like.

The one or more memories 108 may store instructions for execution by the processor 106 to perform certain actions or functions. These instructions may include an operating system module 116 configured to manage hardware resources such as the I/O interfaces 112 and provide various services to applications or modules executing on the processor 106. The one or more memories 108 may also store a datastore 118, a device metrics collection engine 120, one or more applications 122(1), 122(2), . . . , 122(A), a notification module 124, and one or more other modules 126. While described as individual modules herein, it is understood that the functions and operations of various modules may be merged, distributed, and so forth.

The datastore 118 is configured to store information such as configuration files, user information, and so forth. The device metrics collection engine 120 is configured to execute one or more of the applications 122. The device metrics collection engine 120 is configured to execute one or more of the applications 122(1)-122(A). These applications 122(A) may provide a variety of functionality, including SMS clients, email clients, mapping applications, timers, and so forth. The application 122 may comprise instructions in a markup language file stored in the memory 108. These instructions in the markup language file may then be processed or interpreted to execute the application 122. The device metrics collection engine 120 may manage the execution of the application 122, handle memory allocation and determine when to transition an application 122 between a foreground state and a background state. The device metrics collection engine 120 is discussed below with regard to FIGS. 1 and 2 in more detail.

The notification module 124 is configured to receive and process notifications designated for the applications 122 which are in the background state. When transitioning to the background state, the notification module 124 may be configured to register handlers such that the notification module 124 acts for the application 122. The notification module 124 is discussed below in more detail with regard to FIG. 3.

Other modules 126 may be present in the one or more memories 108. These other modules 126 may comprise drivers for I/O devices coupled to the I/O interfaces 112, another rendering engine module, virtual private networking software, and so forth.

The user device 102 may couple to a network 128 via the network interface 114. The network 128 may in turn couple to a server 130. The user device 102 and the server 130 may exchange data 132 via the network 128. The data 132 may include email messages, short message service ("SMS") messages, applications 122, and so forth. The network 128 may include, but is not limited to, the Internet, a private network, a virtual private network, a wireless wide area network, a local area network, a metropolitan area network, a telephone network, and so forth.

It should be appreciated that the program modules, applications, computer-executable instructions, code, or the like depicted in FIG. 11 as being stored in the data storage 108 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 102, and/or hosted on other computing device(s) accessible via one or more networks, may be provided to support functionality provided by the program modules, applications, or computer-executable code depicted in FIG. 11 and/or additional or alternate functionality. Further, functionality may be modularized differently such that processing described as being supported collectively by the collection of program modules depicted in FIG. 11 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 11 may be implemented, at least partially, in hardware and/or firmware across any number of devices.

It should further be appreciated that the device 102 may include alternate and/or additional hardware, software, or firmware components beyond those described or depicted without departing from the scope of the disclosure. More particularly, it should be appreciated that software, firmware, or hardware components depicted as forming part of the device 102 are merely illustrative and that some components may not be present or additional components may be provided in various embodiments. While various illustrative program modules have been depicted and described as software modules stored in data storage 118, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

One or more operations of the methods 800-1000 may be performed by a device having the illustrative configuration depicted in FIG. 11, or more specifically, by one or more engines, program modules, applications, or the like executable on such a device. It should be appreciated, however, that such operations may be implemented in connection with numerous other device configurations.

The operations described and depicted in the illustrative methods of FIGS. 8-10 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 8-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   receiving, by at least one processor associated with a kernel module of a device, periodic notifications that a first application is executing in a user space of the device;

determining, by the at least one processor, that a period of time has elapsed since receiving a most recent notification that the first application is executing in the user space;

determining, by the kernel module, that a first crash event associated with the first application has occurred based at least in part on determining that the period of time has elapsed since receiving the most recent notification;

receiving, by the at least one processor, first data corresponding to the first crash event, the first data comprising a first identifier identifying the first application and a second identifier identifying a first failure source associated with the first crash event;

storing, by the at least one processor, the first data in a buffer in memory associated with a kernel space of the device;

determining, by the at least one processor, that a second crash event associated with a second application has occurred;

receiving, by the at least one processor, second data corresponding to the second crash event, the second data comprising a third identifier identifying the second application and a fourth identifier identifying a second failure source associated with the second crash event;

determining, by the at least one processor, that the first failure source is a same source as the second failure source;

generating, by the at least one processor, device health metrics data by aggregating the first data and the second data into a data structure, wherein aggregating the first data and the second data comprises:

incrementing, by the at least one processor, a first counter of crash events for the first application based on the first crash event;

incrementing, by the at least one processor, a second counter of crash events for the second application based on the second crash event; and sending, by the at least one processor, the device health metrics data and a device identifier of the device to a server.

2. The method of claim 1, further comprising:

determining, by the at least one processor, that the first application was executing in a foreground state during the first crash event;

determining, by the at least one processor, that the second application was executing in a background state during the second crash event; and determining, by the at least one processor, a first value indicative of a first level of severity of the first crash event;

associating, by the at least one processor, the first value with the first crash event;

determining, by the at least one processor, a second value indicative of a second level of severity of the second crash event, a deviation between the first value and a baseline value being greater than a deviation between the second value and the baseline value, the baseline value being associated with execution of the first application and the second application without an exception occurring; and associating, by the at least one processor, the second value with the second crash event.

3. The method of claim 1, further comprising:

determining, by the at least one processor, that a network connection has been terminated;

storing, by the at least one processor, a marker in the memory indicating a first portion of the device health metrics data that has been sent to the server;

determining, by the at least one processor, that a new network connection has been established;

determining, by the at least one processor, using the marker, a second portion of the device health metrics data; and sending, by the at least one processor, a second portion of the device health metrics data to the server.

4. A device, comprising:

at least one memory storing computer-executable instructions; and at least one processor configured to access the at least one memory and execute the computer-executable instructions to:

determine that a first failure event associated with a first application has occurred on the device;

determine a level of severity of the first failure event based at least in part on one or more of:

a state of the device being a sleep state, the first application being executed as background process by the device, or sensor data indicating a user of the device is viewing the device while the first application is being executed;

store first data corresponding to the first failure event in a buffer on the device, the first data comprising a first identifier identifying a first type of failure of the first failure event;

determine that a second failure event associated with a second application has occurred on the device;

store second data corresponding to the second failure event in the buffer, the second data comprising a second identifier identifying a second type of failure of the second failure event;

determine that the first identifier matches the second identifier;

generate device health metrics data by aggregating the first data and the second data into a data structure; and send the device health metrics data and a device identifier of the device to a server.

5. The device of claim 4, wherein the first or second failure event comprises a crash event comprising a frame drop, an application crash, a kernel crash, a kernel panic, termination of a process due to excessive memory usage, and an excessive battery drain.

6. The device of claim 5, wherein the at least one processor is further configured to execute the computer-executable instructions to:

record a crash time associated with the crash event, a frequency of the crash event, or a number of crashes per active CPU usage.

7. The device of claim 5, wherein the device identifier comprises at least one of a device serial number, a device type, a device clock time, and a version of software associated with the device.

8. The device of claim 4, wherein the at least one processor is further configured to execute the computer-executable instructions to:

store a total number of bytes transferred by the device over a wireless network over a predetermined period of time;

store an amount of time taken by the device to boot;

store a screen time associated with the first application or second application;

store an amount of the at least one memory allocated to the first application; and
send, to the server, the total number of bytes transferred by the device, the amount of time the device takes to boot, the screen time for the application, and the amount of the at least one memory allocated to the first application.

9. The device of claim 4, wherein the at least one processor is further configured to execute the computer-executable instructions to:
determine that a network connection has been terminated;
store a marker indicating a first portion of the device health metrics data that has been sent to the server;
determine that a new network connection has been established;
determine, using the marker, a second portion of the device health metrics data; and
send a second portion of the device health metrics data to the server.

10. The device of claim 4, wherein the at least one processor is further configured to execute the computer-executable instructions to:
terminate a component that caused the first or second failure event based at least in part on a performance of the component over a predetermined period of time.

11. The device of claim 4, wherein the at least one processor is further configured to execute the computer-executable instructions to:
receive a configuration file for determining a size of the device health metrics data;
store the configuration file on the device; and
determine the size of the device health metrics data based at least in part on the configuration file on the device.

12. The device of claim 4, wherein aggregating the first data and the second data comprises storing the first identifier and a first number of crash events as a first key-value pair in the data structure and storing the second identifier and a second number of crash events as a second key-value pair in the data structure.

13. The device of claim 4, wherein the at least one processor is further configured to execute the computer-executable instructions to:
generate a metrics report comprising the aggregated device health metrics data.

14. A system of one or more servers, comprising:
at least one memory storing computer-executable instructions; and
at least one processor configured to access the at least one memory and execute the computer-executable instructions to:
receive device health metrics data from one or more devices, wherein the device health metrics data comprise information relating to one or more crash events that occurred on the one or more devices, the information comprising a crash type, a crash time, an identification of a component that caused the crash event, a level of severity of the crash, and a state of a device of the one or more the devices when the crash event occurred;
receive device identification information identifying the one or more devices;
determine the one or more devices are authentic based at least in part on the device identification information;
remove at least a portion of the device identification information from the device health metrics data; and
aggregate device health metrics from two or more devices based at least in part upon a type of device, a software version of the device, or a type of crash event.

15. The system of claim 14, wherein the one or more crash events is at least one of a frame drop, an application crash, a kernel crash, termination of a process due to excessive memory usage, and an excessive battery drain.

16. The system of claim 14, further configured to:
determine a frequency of a type of crash event, a number of crashes per type of device, or a number of crashes per active CPU usage.

17. The system of claim 14, wherein the device identification information comprises at least one of a device serial number, a device type, a device clock time, and a software version of the device.

18. The system of claim 14, wherein the at least one processor is further configured to execute the computer-executable instructions to:
generate a metrics report comprising the aggregated device health metrics data.

19. The system of claim 14, wherein the at least one processor is further configured to execute the computer-executable instructions to:
send one or more configuration files comprising one or more rule sets to the one or more devices, wherein the one or more rule sets determine a size of the device health metrics data.

* * * * *